United States Patent
Kato et al.

(10) Patent No.: US 12,018,410 B2
(45) Date of Patent: Jun. 25, 2024

(54) FIXED CARBON FIBER BUNDLE AND METHOD FOR PRODUCING FIXED CARBON FIBER BUNDLE

(71) Applicant: Teijin Limited, Osaka (JP)

(72) Inventors: Takumi Kato, Osaka (JP); Shuhei Onoue, Osaka (JP)

(73) Assignee: Teijin Limited, Osaka (JP)

( * ) Notice: Subject to any disclaimer, the term of this patent is extended or adjusted under 35 U.S.C. 154(b) by 1093 days.

(21) Appl. No.: 16/647,230

(22) PCT Filed: Aug. 29, 2018

(86) PCT No.: PCT/JP2018/031987
§ 371 (c)(1),
(2) Date: Jul. 2, 2020

(87) PCT Pub. No.: WO2019/058910
PCT Pub. Date: Mar. 28, 2019

(65) Prior Publication Data
US 2021/0054543 A1    Feb. 25, 2021

(30) Foreign Application Priority Data

Sep. 21, 2017    (JP) ................................. 2017-180992

(51) Int. Cl.
*D02G 3/40* (2006.01)
*D02G 3/02* (2006.01)
*D06M 15/59* (2006.01)

(52) U.S. Cl.
CPC ............... *D02G 3/402* (2013.01); *D02G 3/02* (2013.01); *D06M 15/59* (2013.01)

(58) Field of Classification Search
CPC ............................... D02G 3/402; D06M 15/59
See application file for complete search history.

(56) References Cited

U.S. PATENT DOCUMENTS

| | | | |
|---|---|---|---|
| 5,599,612 A | 2/1997 | Muraki et al. | |
| 5,756,206 A * | 5/1998 | Davies | D07B 7/145 428/394 |
| 2015/0025191 A1* | 1/2015 | Naito | D04H 3/002 428/367 |
| 2015/0376404 A1 | 12/2015 | Kummer-Dorner et al. | |

(Continued)

FOREIGN PATENT DOCUMENTS

| | | |
|---|---|---|
| JP | H01292038 A | 11/1989 |
| JP | H04-057974 A | 2/1992 |
| JP | H07314443 A | 12/1995 |

(Continued)

OTHER PUBLICATIONS

Supplementary EU Search Report for EP18859361, dated Oct. 8, 2020.

(Continued)

*Primary Examiner* — Robert A Vetere
(74) *Attorney, Agent, or Firm* — MaxGoLaw PLLC

(57) ABSTRACT

The present invention provides a fixed carbon fiber bundle to which a fixing agent is adhered, wherein the fixing agent adheres to an area comprising at least 50% of at least one side of a carbon fiber bundle, the average thickness of the fixed carbon fiber bundle is 180 μm or less, and the separated fiber tear load is 0.02N to 1.00N.

15 Claims, 2 Drawing Sheets

(56) References Cited

U.S. PATENT DOCUMENTS

| | | | |
|---|---|---|---|
| 2017/0145627 A1* | 5/2017 | Sakurai | ................ D06M 15/59 |
| 2017/0355550 A1 | 12/2017 | Kawahara et al. | |

FOREIGN PATENT DOCUMENTS

| | | |
|---|---|---|
| JP | 09038972 A | 2/1997 |
| JP | 2003166174 A | 6/2003 |
| JP | 2004124301 A | 4/2004 |
| JP | 2004263359 A | 9/2004 |
| JP | 2007216432 A | 8/2007 |
| JP | 2008-297670 A | 12/2008 |
| JP | 2014030913 A | 2/2014 |
| JP | 2015-218417 A | 12/2015 |
| JP | 2016-003412 A | 1/2016 |
| JP | 2016003412 A | 1/2016 |
| JP | 2016-509638 A | 3/2016 |
| JP | 2016-060976 A | 4/2016 |
| KR | 20170081117 A | 7/2017 |
| WO | 2013/133421 A1 | 9/2013 |
| WO | 2013133421 A1 | 9/2013 |
| WO | 2016/104154 A1 | 6/2016 |

OTHER PUBLICATIONS

Int'l. Search Report for PCT/JP2018/031987, dated Nov. 20, 2018.
Notice of Dispatch of Duplicates of a Written Opposition issued in JP Patent Appln. No. 2021-701103, dated Dec. 23, 2021.
Communication pursuant to Article 94(3) EPC issued in EP Patent Appln. No. 18859351.1, dated Oct. 21, 2020.
Notice of Reasons for Refusal issued Oct. 27, 2020 in corresponding Japanese patent appln. No. 2019-543510.

* cited by examiner

FIXED CARBON FIBER BUNDLE AND METHOD FOR PRODUCING FIXED CARBON FIBER BUNDLE

TECHNICAL FIELD

The present invention relates to a fixed carbon fiber bundle in which a carbon fiber bundle is fixed by using a fixing agent, a method for producing the fixed carbon fiber bundle, and a method for producing a composite material using the fixed carbon fiber bundle.

BACKGROUND ART

A composite material that uses carbon fibers as a reinforcing material has a high tensile strength, a high tensile elastic modulus and a small linear expansion coefficient, and thus has excellent dimensional stability, and excellent heat resistance, chemical resistance, fatigue resistance, abrasion resistance, electromagnetic wave shielding properties, and radiolucency. Therefore, the composite material using carbon fibers as a reinforcing material is widely applied to automobiles, sports or leisure, aerospace or space, and general industrial applications.

In particular, a so-called thermoplastic composite material containing carbon fibers and a thermoplastic matrix resin is noticed. Since carbon fibers are present in the thermoplastic matrix resin, these fiber-reinforced resin molded bodies have excellent mechanical properties and are noticed as structural members of automobiles and the like. In particular, an opening technique of the carbon fiber bundle is important for securing physical properties necessary for the structural members.

For example, Patent Literature 1 describes a method and an apparatus that fill a surface of a carbon fiber bundle with a heat-fusible yarn supplied in a meandering shape after the carbon fiber bundle is opened, thereby maintaining a parallel state of the carbon fiber bundle.

CITATION LIST

Patent Literature

Patent Literature 1: JP-A-2015-218417

SUMMARY OF INVENTION

Technical Problem

When the composite material containing carbon fibers and a matrix resin is produced, in general, the opened carbon fiber bundle is further divided by a slit or the like.

However, in the invention described in Patent Literature 1, since the heat-fusible yarn is supplied in a meandering shape and the surface of the fiber bundle is filled, the fiber bundle cannot be divided neatly. In other words, in the invention described in Patent Literature 1, there are following problems: 1. a bundle width of the carbon fiber bundle is not uniform due to heat shrinkage after melt solidification of the heat-fusible fiber supplied in a meandering shape; and 2. fuzz is easy to be generated in a part where the heat-fusible fiber is not supplied since a part where the heat-fusible fiber is supplied and the part where the heat-fusible fiber is not supplied are mixed.

When the carbon fiber bundle is divided and used for a composite material, physical properties of the composite material depend on the number of filaments (single fibers) contained in the carbon fiber bundle or the like, but the invention described in Patent Literature 1 cannot divide with controlling the number of filaments (single fibers) contained in the carbon fiber bundle stably. In particular, when an average thickness of the carbon fiber bundle is made thin, the carbon fiber bundle may crack in a width direction at an unintended place, and the carbon fiber bundle cannot be divided to a target width in some cases.

On the other hand, when a publicly known unidirectional fiber-reinforced composite material containing a carbon fiber and a thermoplastic matrix resin is used as a fixed carbon fiber bundle, since a dividing tear load exceeds 1.00N, a processing stress necessary for dividing is too large, and a size of an apparatus becomes large, making it difficult to produce a carbon fiber bundle having a narrow width.

Therefore, an object of the present invention is to provide a fixed carbon fiber bundle that can be stably divided, which is a fixed carbon fiber bundle in which an opened carbon fiber bundle is fixed by a fixing agent, a method for producing the fixed carbon fiber bundle, and a method for producing a composite material using the fixed carbon fiber bundle.

Solution to Problem

In order to solve the above problems, the present invention provides the following means.

1. A fixed carbon fiber bundle to which a fixing agent adheres, in which
    the fixing agent adheres to at least one side of the carbon fiber bundle,
    an average thickness of the fixed carbon fiber bundle is 180 μm or less, and
    a dividing tear load of the fixed carbon fiber bundle is 0.02N or more and 1.00N or less.
2. The fixed carbon fiber bundle according to the above 1, in which the fixing agent adheres to an area of at least 50% or more of one side of the carbon fiber bundle.
3. The fixed carbon fiber bundle according to the above 1 or 2, in which a weight fraction of the fixing agent contained in the fixed carbon fiber bundle is 0.5% or more and 30% or less with respect to the entire fixed carbon fiber bundle.
4. The fixed carbon fiber bundle according to any one of the above 1 to 3, in which the fixing agent is a thermoplastic resin having a softening point of 60° C. or higher and 250° C. or lower.
5. The fixed carbon fiber bundle according to any one of the above 1 to 4, in which the fixing agent is localized on one side or both sides of the carbon fiber bundle.
6. A method for producing a fixed carbon fiber bundle, including:
    causing a fixing agent to adhere to a carbon fiber bundle before or after opening of the carbon fiber bundle; and
    fixing a width and a thickness of the carbon fiber bundle after setting an average thickness to 180 μm or less, in which
    the fixing agent adheres to at least one side of the carbon fiber bundle, and a dividing tear load of the fixed carbon fiber bundle is 0.02N or more and 1.00N or less.
7. The method for producing a fixed carbon fiber bundle according to the above 6, in which the fixing agent adheres to an area of at least 50% or more of one side of the carbon fiber bundle.

8. The method for producing a fixed carbon fiber bundle according to the above 6 or 7, in which the fixing agent adheres to the carbon fiber bundle after opening of the carbon fiber bundle.

9. The method for producing a fixed carbon fiber bundle according to any one of the above 6 to 8, in which a weight fraction of the fixing agent contained in the fixed carbon fiber bundle is 0.5% or more and 30% or less with respect to the entire fixed carbon fiber bundle.

10. The method for producing a fixed carbon fiber bundle according to any one of the above 6 to 9, in which the fixing agent is a thermoplastic resin having a softening point of 60° C. or higher and 250° C. or lower, and the fixing agent fixes the carbon fiber bundle by melt solidification.

11. The method for producing a fixed carbon fiber bundle according to any one of the above 6 to 10, in which a method for causing the fixing agent to adhere to the carbon fiber bundle is a dry process.

12. The method for producing a fixed carbon fiber bundle according to any one of the above 6 to 11, in which the fixing agent is a powder having a median diameter of 5 μm or more and 300 μm or less.

13. The method for producing a fixed carbon fiber bundle according to the above 12, in which an average distance between single fibers of the carbon fiber bundle is smaller than the median diameter of the fixing agent.

14. The method for producing a fixed carbon fiber bundle according to any one of the above 11 to 13, in which the method of causing the fixing agent to adhere to the carbon fiber bundle is a method of charging the fixing agent to adhere to the carbon fiber bundle.

15. The method for producing a fixed carbon fiber bundle according to any one of the above 6 to 14, in which the fixing agent is localized on one side or both sides of the carbon fiber bundle.

16. A method for producing a divided fixed carbon fiber bundle, in which two or more divided fixed carbon fiber bundles are produced by dividing the fixed carbon fiber bundle produced by the method for producing the fixed carbon fiber bundle according to any one of the above 6 to 15.

17. A method for producing a discontinuous divided fixed carbon fiber bundle, in which the discontinuous divided fixed carbon fiber bundle is produced by cutting the divided fixed carbon fiber bundles produced by the method for producing the divided fixed carbon fiber bundle according to the above 16.

18. A method for producing a composite material, including: impregnating the discontinuous divided fixed carbon fiber bundle produced by the method for producing the discontinuous divided fixed carbon fiber bundle according to the above 17 with a thermoplastic matrix resin.

Advantageous Effects of Invention

According to the fixed carbon fiber bundle of the present invention, since the fixing agent adheres to at least one side (preferably an area of 50% or more of one side) of the carbon fiber bundle and the carbon fiber bundle is fixed and adjusted, control of the thickness and width of the fixed carbon fiber bundle during dividing is extremely easy.

DESCRIPTION OF EMBODIMENTS

[Carbon Fiber]

Figure 1:
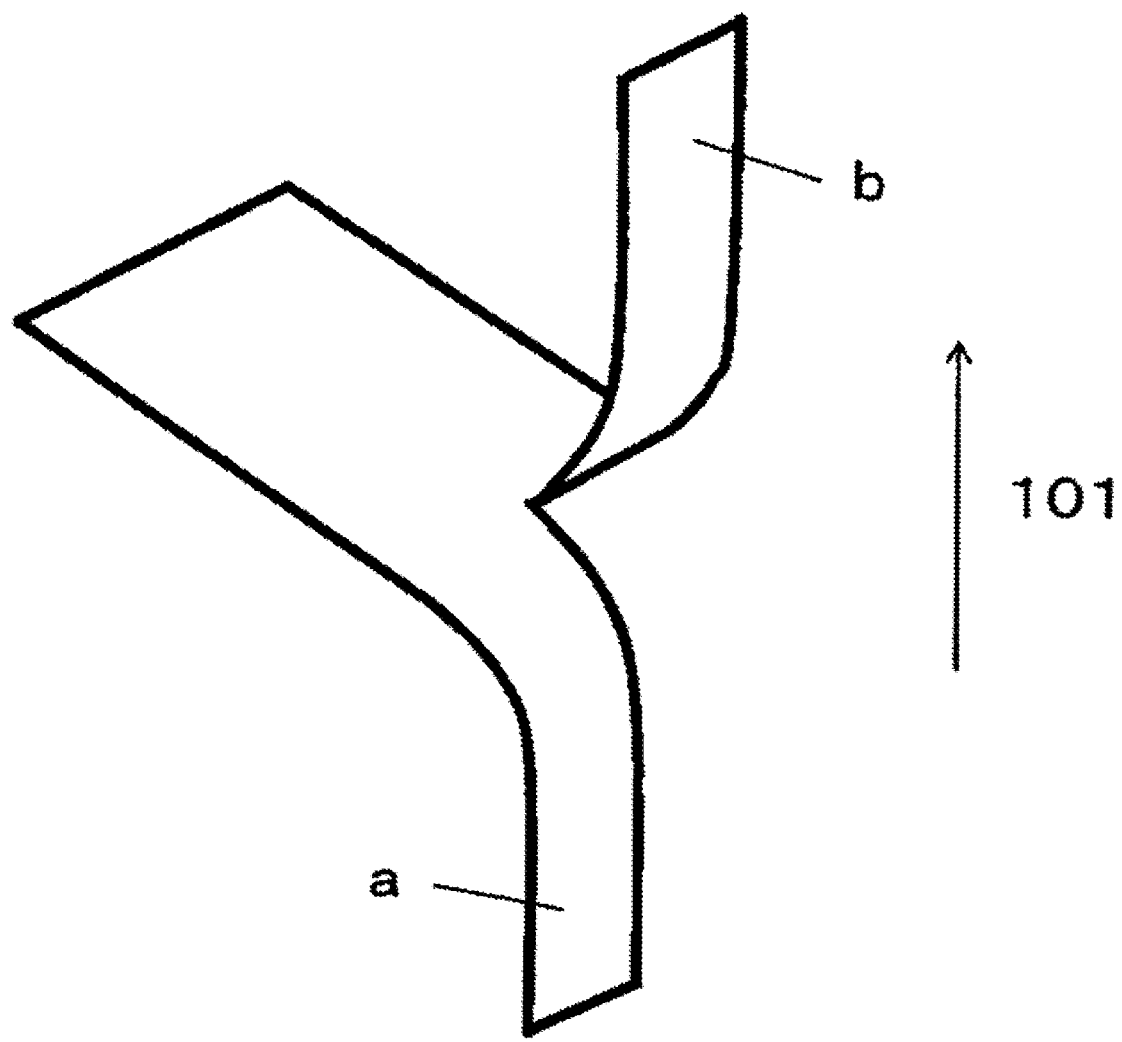
FIG. 1 is a schematic diagram showing a method for measuring a dividing tear load.
Figure 2:
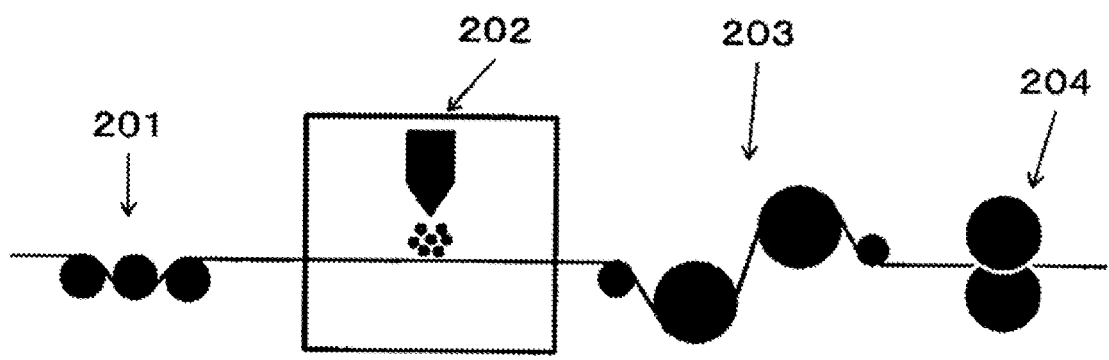
FIG. 2 is a schematic diagram showing a production process of a fixed carbon fiber bundle.

A polyacrylonitrile (PAN)-based carbon fiber, a petroleum/coal pitch-based carbon fiber, a rayon-based carbon fiber, a cellulose-based carbon fiber, a lignin-based carbon fiber, a phenol-based carbon fiber, and the like are known as a carbon fiber used in the present invention, and any carbon fiber of these can be suitably used in the present invention. In particular, the polyacrylonitrile (PAN)-based carbon fiber is preferably used in view of excellent tensile strength in the present invention.

[Sizing Agent of Carbon Fiber]

A sizing agent may adhere to a surface of the carbon fiber used in the present invention. When the carbon fiber to which the sizing agent adheres is used, a type of the sizing agent can be appropriately selected depending on types of the carbon fiber and a thermoplastic matrix resin, and is not particularly limited.

[Fiber Diameter of Single Fiber (Filament) of Carbon Fiber]

A fiber diameter of a single fiber of the carbon fiber used in the present invention may be appropriately determined depending on the type of the carbon fiber, and is not particularly limited. In general, an average fiber diameter is preferably in a range of 3 μm to 50 μm, more preferably in a range of 4 μm to 12 μm, and still more preferably in a range of 5 μm to 8 μm. Here, the average fiber diameter refers to a diameter of the single fiber of the carbon fiber. Therefore, when the carbon fiber has a fiber bundle shape, the average fiber diameter does not refer to a diameter of the fiber bundle, but refers to the diameter of the single fiber of the carbon fiber constituting the fiber bundle. The average fiber diameter of the carbon fiber can be measured, for example, by a method described in JIS R 7607: 2000.

In the present description, the single fiber is referred to as a filament in some cases.

[Fixing Agent]

A type of a fixing agent used in the present invention is not particularly limited as long as the carbon fiber bundle can be fixed, but the fixing agent is preferably a solid at normal temperature, more preferably a resin, and still more preferably a thermoplastic resin.

The fixing agent may be only one type or two or more types.

When the thermoplastic resin is used as the fixing agent, one having a desired softening point can be appropriately selected and used depending on an environment in which the fixed carbon fiber bundle is produced. A range of the softening point is not limited, but a lower limit value of the softening point is preferably 60° C. or higher, more preferably 70° C. or higher, and still more preferably 80° C. or higher. Since the softening point of the fixing agent is set to 60° C. or higher, the fixing agent is preferable since it is solid at room temperature and excellent in operability even in a use environment at high temperature in summer. On the other hand, the upper limit is preferably 250° C. or lower, more preferably 180° C. or lower, still more preferably 150° C. or lower, and even more preferably 125° C. or lower. Since the softening point of the fixing agent is set to 250° C. or lower, the fixing agent can be sufficiently heated by a simple heating device, the fixing agent is easy to be cooled and solidified, and thus a time until the carbon fiber bundle is fixed is preferably shortened. In a case of contact heating, a contact surface of the heating device can be subjected to surface treatment with a material where heat resistance can be compatible with release properties, for example, polytetrafluoroethylene (PTFE).

Here, the softening temperature refers to a melting temperature when the thermoplastic resin is a crystalline polymer, and refers to a temperature at a peak of a crystal melting curve of differential scanning calorimetry (DSC) measured at a rate of temperature increase of 15° C. from room temperature to 300° C. The melting temperature means a melting point of the thermoplastic resin. In a case of an amorphous polymer in which the thermoplastic resin does not give a crystal melting peak by DSC measurement, the softening temperature is defined by a Vicat softening point (JIS K 7206: 2016).

Examples of the specific thermoplastic resin can include a polyolefin resin, a polystyrene resin, a polyamide resin, a polyester resin, a polyacetal resin (polyoxymethylene resin) and a polycarbonate resin, a (meth)acrylic resin, a polyarylate resin, a polyphenylene ether resin, a polyimide resin, a polyethernitrile resin, a phenoxy resin, a polyphenylene sulfide resin, a polysulfone resin, a polyketone resin, a polyetherketone resin, a thermoplastic urethane resin, a fluororesin resin, and a thermoplastic polybenzimidazole resin.

Examples of the polyolefin resin can include a polyethylene resin, a polypropylene resin, a polybutadiene resin, a polymethylpentene resin, a vinyl chloride resin, a vinylidene chloride resin, a vinyl acetate resin, and a polyvinyl alcohol resin. Examples of the polystyrene resin can include a polystyrene resin, an acrylonitrile-styrene resin (AS resin), and an acrylonitrile-butadiene-styrene resin (ABS resin). Examples of the polyamide resin can include a polyamide 6 resin (nylon 6), a polyamide 11 resin (nylon 11), a polyamide 12 resin (nylon 12), a polyamide 46 resin (nylon 46), a polyamide 66 resin (nylon 66), a polyamide 610 resin (nylon 610), and a copolymerized polyamide. Examples of the polyester resin can include a polyethylene terephthalate resin, a polyethylene naphthalate resin, a polybutylene terephthalate resin, a polytrimethylene terephthalate resin, and a liquid crystal polyester. Examples of the (meth)acrylic resin can include polymethyl methacrylate. Examples of the polyphenylene ether resin can include modified polyphenylene ether. Examples of the polyimide resin can include thermoplastic polyimide, polyamide-imide resin, and polyetherimide resin. Examples of the polysulfone resin can include a modified polysulfone resin and a polyether sulfone resin. Examples of the polyether ketone resin can include a polyether ketone resin, a polyether ether ketone resin, and a polyether ketone ketone resin. Examples of fluororesin can include polytetrafluoroethylene.

Examples of an aspect in which two or more types of the thermoplastic resin are used in combination as the fixing agent can include an aspect in which thermoplastic resins having a different softening point from each other are used in combination and an aspect in which thermoplastic resins having different average molecular weights from each other are used in combination, but are not limited thereto.

The fixing agent is preferably a powder having a median diameter of 5 μm or more and 300 μm or less.

Furthermore, an average distance between single fibers of the carbon fiber bundle is preferably smaller than a median diameter of the fixing agent.

By making the median diameter of the fixing agent larger than the average distance between single fibers of the carbon fiber bundle, the fixing agent cannot penetrate into an interior of the carbon fiber bundle, and only a surface of the obtained fixed carbon fiber bundle can be fixed with the fixing agent to reduce internal binding force. That is, the fixing agent can be located on one side or both sides in the fixed carbon fiber bundle (a fixed carbon fiber bundle in which no fixing agent is present inside the carbon fiber bundle can be made). Accordingly, when the fixed carbon fiber bundle of the present invention is divided or cut, it is possible to stably obtain a single fiber in a moderately contained state together with a slim-line bundle. Thus, the fixed carbon fiber bundle of the present invention has an advantage that it is easy to control distribution of the bundle or single fiber.

The average distance between single fibers of the carbon fiber bundle is calculated from the following formula (b) by using the number of the single fibers (Mi) contained in the carbon fiber, a width (Wi μm) of the carbon fiber bundle, a thickness (Ti μm) of the carbon fiber bundle, and a fiber diameter (Di μm).

$$\text{Average distance between single fibers}(\mu m) = Wi/(Mi/(Ti/Di)) - Di \quad (b)$$

[Adhesion of Fixing Agent to Carbon Fiber Bundle]

In the present invention, the fixing agent adheres to at least one side of the carbon fiber bundle. The fixing agent adheres to preferably 50% or more of one side, more preferably 70% or more of one side, and still more preferably 80% or more of one side. Further, the fixing agent may adhere to not only one side but also both sides. Here, "one side" refers to one side of the carbon fiber bundle viewed from a thickness direction. Since the average thickness of the fixed carbon fiber bundle in the present invention is 180 μm or less, a cross-sectional shape of the fixed short fiber bundle has a flattened shape, and one side of the carbon fiber bundle is clearly known in many cases.

A preferable embodiment of the present invention is
a fixed carbon fiber bundle to which a fixing agent adheres, in which
the fixing agent adheres to at least an area of 50% or more of one side of the carbon fiber bundle,
the average thickness of the fixed carbon fiber bundle is 180 μm or less, and
a dividing tear load of the fixed carbon fiber bundle is 0.02N or more and 1.00N or less.

In a case of the carbon fiber bundle described in the above-described Patent Literature 1 (JP-A-2015-218417), the thermoplastic resin fiber is not applied on at least 50% of one side surface of the carbon fiber bundle, so that dividing cannot be stabled.

[Weight Fraction of Fixing Agent]

A weight fraction of the fixing agent contained in the fixed carbon fiber bundle is preferably 0.5% or more and 30% or less with respect to the entire fixed carbon fiber bundle. A lower limit of the weight fraction of the fixing agent is more preferably 1% or more, still more preferably 2% or more, and even more preferably 3% or more with respect to the entire fixed carbon fiber bundle. Since the weight fraction of the fixing agent is 0.5% or more, the opened carbon fiber bundle can be stably fixed. On the other hand, an upper limit of the weight fraction of the fixing agent is more preferably 20% or less, still more preferably 15% or less, and even more preferably 10% or less with respect to the entire fixed carbon fiber bundle. Since the weight fraction of the fixing agent is 30% or less, the fixing agent is reduced with respect to a fraction of the matrix resin (preferably the thermoplastic matrix resin has a higher softening point than the fixing agent) when the fixed carbon fiber bundle is used as a composite material, so that heat resistance can be ensured even when the fixing agent having a low softening point is used.

[Fixed Carbon Fiber Bundle]

1. Average Thickness of Fixed Carbon Fiber Bundle

The average thickness of the fixed carbon fiber bundle in the present invention is 180 μm or less.

The average thickness of the fixed carbon fiber bundle in the present invention is preferably 150 μm or less, and more preferably 120 μm or less. If it is such a thickness, the fixed carbon fiber bundle is easily impregnated with a thermoplastic matrix resin to be described later.

In order to set the average thickness of the fixed carbon fiber bundle within the above range, the average thickness of the carbon fiber bundle just before the fixing agent is supplied is adjusted in an opening step to be preferably 140 μm or less, more preferably 100 μm or less, and still more preferably 80 μm or less. Since the thickness of the carbon fiber bundle is set in the range, the fixing agent easily penetrates, and the carbon fiber bundle is easily fixed.

2. Dividing Tear Load of Fixed Carbon Fiber Bundle

Easiness of dividing the fixed carbon fiber bundle can be represented by a tear load. In the fixed carbon fiber bundle in the present invention, the dividing tear load of the fiber bundle is 0.02N or more and 1.00N or lea.

Although a method for evaluating the dividing tear load will be described later, a lower limit of the dividing tear load is more preferably 0.05N or more. By setting the dividing tear load to 0.02N or more, since the fixed carbon fiber bundle can be prevented from escaping from a blade for dividing the fixed carbon fiber bundle, the dividing is stabled.

Figure 3:
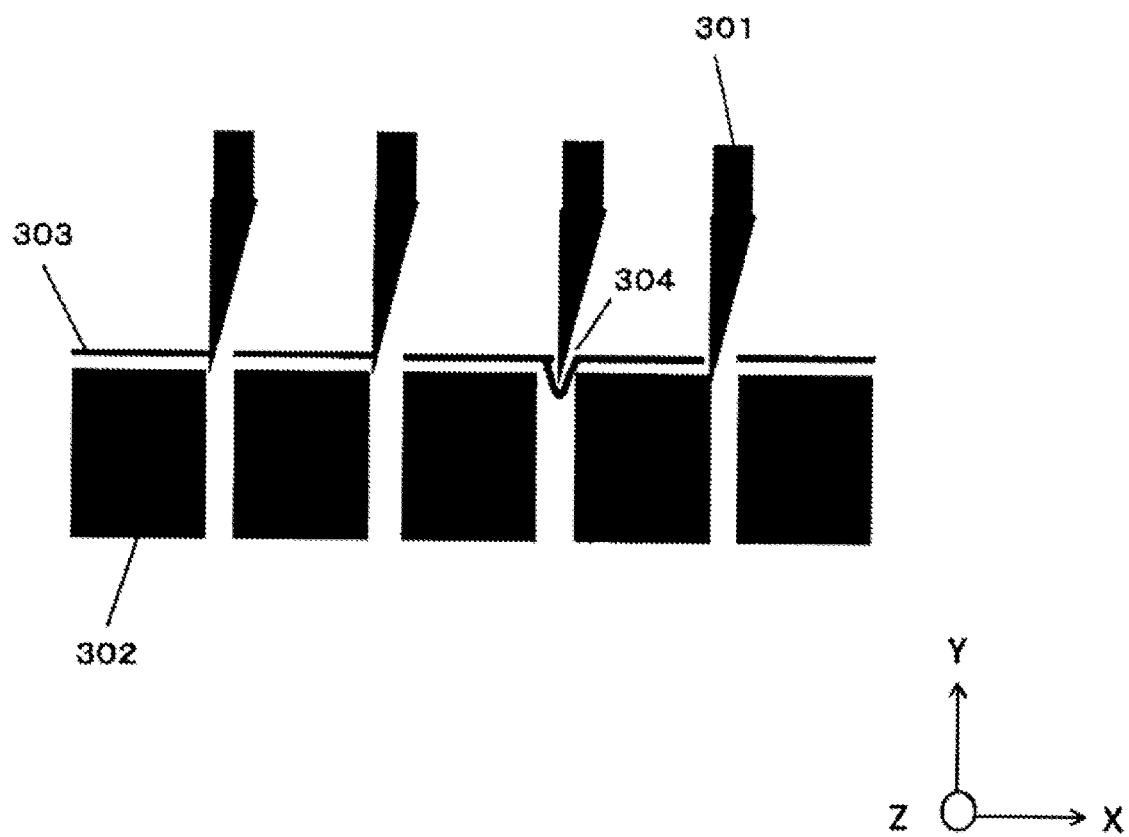
FIG. 3 is a schematic diagram showing a state in which the fixed carbon fiber bundle escapes from a dividing blade.

FIG. 3 shows a state in which the fixed carbon fiber bundle escapes from the blade for dividing the fixed carbon fiber bundle. A depth indicates a machine direction (MD), and an X direction indicates a width direction of the carbon fiber bundle. The fixed carbon fiber bundle (303 in FIG. 3) is divided by an upper blade (301) and a lower blade (302), but when the dividing tear load of the fixed carbon fiber is low, the fixed carbon fiber bundle escapes from the blade for dividing as 304 in FIG. 3.

On the other hand, the upper limit of the dividing tear load is more preferably 0.80N or less, and still more preferably 0.40N or less. By setting the dividing tear load to 1.00N or less, it is possible to reduce a processing stress required for dividing, and thus dividing can be performed stably.

3. Dividing Tear Load Per Unit Thickness of Fixed Carbon Fiber Bundle

A dividing tear load per unit thickness of the fixed carbon fiber bundle (dividing tear load÷thickness of fixed carbon fiber bundle) is preferably 0.2 N/mm or more and 5.0 N/mm or less, more preferably 0.2 N/mm or more and 2.0 N/mm or less, and still more preferably 0.3N/mm or more and 1.8 N/mm or less.

[Method for Producing Fixed Carbon Fiber Bundle]

A method for producing the fixed carbon fiber bundle in the present invention is a method for producing the fixed carbon fiber bundle, including: causing the fixing agent to adhere to the carbon fiber bundle before or after opening of the carbon fiber bundle; and fixing a width and a thickness of the carbon fiber bundle after setting the average thickness to 180 μm or less, in which the fixing agent adheres to at least one side (preferably an area of 50% or more of one side) of the carbon fiber bundle, and the dividing tear load of the fixed carbon fiber bundle is 0.02N or more and 1.00N or less. The fixing agent preferably adheres to the carbon fiber bundle after opening of the carbon fiber bundle.

A preferable embodiment of the present invention is a method for producing the fixed carbon fiber bundle, including:
causing the fixing agent to adhere to the carbon fiber bundle before or after opening of the carbon fiber bundle; and
fixing a width and a thickness of the carbon fiber bundle after setting the average thickness to 180 μm or less, in which
the fixing agent adheres to at least an area of 50% or more of one side of the carbon fiber bundle, and the dividing tear load of the fixed carbon fiber bundle is 0.02N or more and 1.00N or less.

Hereinafter, the method for producing the fixed carbon fiber bundle will be specifically described.

There is no limit to a method for opening the carbon fiber bundle, and a method of passing the carbon fiber bundle through a plurality of fixing bars, a method of being in contact with those having curvature, a method of using a fluid such as air flow, a method of applying ultrasonic waves, and the like can be used.

There is no limit to a method in which the fixing agent adheres, but a method that can uniformly apply the fixing agent without unevenness is preferable. When a powdery agent is used as a raw material of the fixing agent, a coating method with a spray gun, a method of fluidizing dipping, and a method of melting and coating are exemplified. When the raw material of the fixing agent is dispersed in a solution, the coating method with a spray gun, a method using a coater, and a method of dipping the fiber bundle in the solution are exemplified. The method in which the fixing agent adheres is preferably a dry process (a method in which a solvent is not used). By applying the fixing agent in the dry process, a step of removing a solvent is not required, and energy necessary for fixing the carbon fiber bundle can be reduced compared with application of the fixing agent in the wet process (a method of using a solvent). In the case of the wet process, a concentration changes in some cases due to solvent volatilization during operation, and concentration management may be necessary, but the concentration management is not required in the dry process which is preferable. In the case of the dry process, it is easy to reuse the fixing agent that has not adhered to the carbon fiber bundle.

As a method for applying the dry fixing agent, a method of charging the fixing agent to adhere to the carbon fiber bundle (for example, powder coating) is preferable. Since the carbon fiber is electrically conductive, the fixing agent is charged and the carbon fiber is grounded, so that the fixing agent can efficiently adhere to the carbon fiber by using a potential difference. In more detail, an amount of adhesion of the fixing agent to the carbon fiber bundle with respect to a supply amount of the fixing agent can be increased, and adhesion efficiency can be increased. More specifically, the adhesion efficiency can be increased to the range of 50% to 80%. The adhesion efficiency is represented by the following formula (a).

$$\text{Adhesion efficiency (\%)}=(\text{adhesion amount to carbon fiber bundle/supply amount of fixing agent})\times 100 \tag{a}$$

Examples of the method for charging the fixing agent include a treatment method by corona discharge. The treatment of the fixing agent by corona discharge can be performed, for example, by applying a high voltage to a corona electrode at a tip of the coating gun, causing corona discharge from the electrode, and charging a coating material with ions generated by discharge.

When the weight fraction of the fixing agent contained in the fixed carbon fiber bundle is 0.5% or more and 30% or less with respect to the entire fixed carbon fiber bundle, it is particularly preferable to produce the fixed carbon fiber bundle by a method of charging the fixing agent to adhere to the carbon fiber bundle.

There is no particular limit to a method of causing the fixing agent to adhere to the carbon fiber bundle and fixing the width and thickness of the carbon fiber bundle after setting the average thickness to 180 μm or less, but the fixing agent is preferably a thermoplastic resin having a softening point of 60° C. or more and 250° C. or less to fix the carbon fiber bundle by melt solidification. There is no limit to a heating method at the time of melting, and examples thereof include a method of heating by being in contact with a heated fixing bar, roller, or the like, and a method of heating in a non-contact manner using heated air or the like, or an infrared heater. The width of the carbon fiber bundle refers to a direction longer than the thickness.

Examples of a method of melting and solidifying the fixing agent include a method of heating the fixing agent in a contact manner by a heating roller or the like in a state in which the fixing agent is melted, and a method of heating the fixing agent in a non-contact manner by an infrared heater or hot air.

In addition, the thickness of the fixed carbon fiber bundle can be made uniform by pressurization. After pressure is applied, the fixed carbon fiber bundle can be produced by using a cooling roll and solidifying the fixing agent by natural cooling.

The fixing of the width and thickness of the carbon fiber bundle do not have to fix the width and thickness completely, and it is preferable to fix such that elasticity in the width direction is maintained to some extent since dividing is easy in a subsequent step. That is, in other words, the fixed carbon fiber bundle having a dividing tear load of 0.02N or more and 1.00N or less is also an index indicating a degree of fixing of the width and thickness of the carbon fiber bundle.

As the method for producing the fixed carbon fiber bundle, the fixing agent is applied to the carbon fiber bundle, then the carbon fiber bundle is opened, and the fixing agent is melt and solidified to fix the width and thickness of the carbon fiber bundle, and a fixed carbon fiber bundle having a dividing tear load of 0.02N or more and 1.00N or less can be obtained.

[Dividing of Fixed Carbon Fiber Bundle]

The fixed carbon fiber bundle in the present invention is preferably divided to produce two or more divided fixed carbon fiber bundles.

There is no limit to a method for dividing, and a dividing method such as a shearing method of cutting by shearing of an upper blade and a lower blade, a gang method of cutting by providing a route difference by engagement of the blade, and a scoring method of cutting between a rotation blade and a rubber roll receiving the blade may be used.

When the carbon fiber bundle described in the above Patent Literature 1 is used, there is a portion where the carbon fiber bundle easily escapes from a dividing blade since there is a portion that is not filled with a heat-fusible fiber. There is also a problem that fuzz easily occurs at the time of dividing.

[Discontinuous Fixed Carbon Fiber Bundle]

The divided fixed carbon fiber bundle (referred to as a divided fixed carbon fiber bundle in some cases in the present description) is preferably cut to produce a discontinuous divided fixed carbon fiber bundle.

There is no limit to the method of cutting, and examples thereof include methods such as a guillotine method, a propeller blade method, and a rotary cutter method. A length of the fixed carbon fiber bundle in the obtained discontinuous divided fixed carbon fiber bundles is evaluated by a weight average length of the fixed carbon fiber bundle. The weight average length of the fixed carbon fiber bundle can be determined, for example, by measuring lengths of 100 randomly extracted discontinuous fixed carbon fiber bundle individually to a 1 mm unit using a caliper or the like.

[Composite Material]

The composite material in the present invention can be prepared by impregnating the fixed carbon fiber bundle or the discontinuous divided fixed carbon fiber bundle with the thermoplastic matrix resin. In the present description, the fixed carbon fiber bundle is not referred to as the composite material. The composite material in the present description is obtained by impregnating the fixed carbon fiber bundle with the thermoplastic matrix resin apart from the fixing agent.

As one embodiment of the composite material, a one-direction material can be obtained by impregnating a plurality of the fixed carbon fiber bundles or the divided fixed carbon fiber bundles in a state of being arranged in parallel without gaps with the thermoplastic matrix resin. At this time, the thermoplastic matrix resin is preferably compatible with the fixing agent.

As another embodiment of the composite material, the composite material that can be formed into a complex shape can be produced by impregnating the discontinuous divided fixed carbon fiber bundle in a state of being scattered in a mat shape with the thermoplastic matrix resin. In this case, it is possible to use a material having isotropic properties in in-plane directions (directions perpendicular to a plate thickness of the composite material) by randomly dispersing the discontinuous divided fixed carbon fiber bundles.

[Impregnation]

In the composite material according to the present invention, it is preferable that the divided fixed carbon fiber bundle is impregnated with the thermoplastic matrix resin, and it is preferable that the impregnating thermoplastic matrix resin is compatible with the fixing agent. The impregnation with the thermoplastic matrix resin is to fill space between the fixed carbon fiber bundles and between filaments in the fixed carbon fiber bundle with the thermoplastic matrix resin, but there is no need to completely fill, and voids may remain on one part.

[Carbon Fiber Volume Fraction of Composite Material]

In the present invention, there is no particular limit to a carbon fiber volume fraction contained in the composite material (hereinafter, may be simply referred to as "Vf"), which is defined by the following formula (c), but the carbon fiber volume fraction (Vf) is preferably 10% to 60%, more preferably 20% to 50%, and still more preferably 25% to 45%.

Carbon fiber volume fraction($Vf$)=100×carbon fiber volume/(carbon fiber volume+fixing agent volume+thermoplastic matrix resin volume)  (c)

When the carbon fiber volume fraction (Vf) in the composite material is 10% or more, desired mechanical properties are easily obtained. On the other hand, when the carbon fiber volume fraction (Vf) in the composite material does not exceed 60%, fluidity when the composite material is used for press molding or the like is good, and a desired molded body shape is easily obtained.

[Thermoplastic Matrix Resin]

The thermoplastic matrix resin used in the composite material of the present invention is not particularly limited, and those having a desired softening point or melting point can be appropriately selected and used. As the thermoplastic matrix resin, those having a softening point in a range of 180° C. to 350° C. are generally used, but the present invention is not limited thereto.

[Molded Body]

The composite material produced by impregnating the discontinuous divided fixed carbon fiber bundle with the thermoplastic matrix resin preferably press-molded to produce a molded body.

As a preferable press molding method for producing the molded body, compression molding using a cold press or a hot press is used.

1. Cold Press Method

In a cold press method, for example, the composite material heated to a first predetermined temperature is thrown into a mold set to a second predetermined temperature, and then pressurization and cooling are performed. That is, the cold press method includes at least the following step A-1) to step A-3).

Step A-1): A step of heating the composite material to a softening temperature or higher of the thermoplastic matrix resin contained in the composite material.

Step A-2): A step of disposing the heated composite material obtained in the above step A-1) in a mold set to a temperature lower than the softening temperature of the thermoplastic matrix resin.

Step A-3): A step of pressurizing and molding the composite material disposed in the mold in the above step A-2).

By performing these steps, molding of the composite material can be completed.

In a case of press molding by the cold press method, there is an advantage that the molding time is shorter than that in a hot press method. On the other hand, the composite material is difficult to flow since a temperature of the mold is low.

2. Hot Press Method

A hot press method includes at least the following step B-1) to step B-3).

Step B-1): A step of disposing the composite material in a mold

Step B-2): A step of heating the mold to a softening temperature or higher of the thermoplastic matrix resin and pressurizing the mold Step B-3): A step of adjusting a temperature of the mold to lower than the softening point of the thermoplastic matrix resin to mold the composite material 3. With Regard to Common Items to Both Press Methods When the composite material is thrown into the mold, the composite material is used alone (one piece) or in a plurality of pieces in accordance with a plate thickness of a target molded body. The step A-3) and step B-2) are steps of obtaining the molded body having a desired shape by applying pressure to the composite material. Molding pressures at these times are not particularly limited, and are preferably less than 30 MPa, more preferably 20 MPa or less, and even more preferably 10 MPa or less. As a matter of course, various steps may be put between the above steps at the time of press molding, for example, vacuum compression molding in which press molding is performed under vacuum may be used.

EXAMPLES

Hereinafter, the present invention will be described in detail using Examples, but the present invention is not limited thereto.

1. Raw materials used in the following Production Examples and Examples are as follows. A decomposition temperature is a measurement result by thermogravimetric analysis.

(PAN-Based Carbon Fiber)

Carbon fiber "TENAX" (registered trademark) STS40-24K (average fiber diameter 7 μm) manufactured by Teijin Limited (Fixing Agent)

Fixing agent 1: Copolymerized nylon "VESTAMELT" (registered trademark) Hylink manufactured by Daicel-Evonik Ltd., thermoplastic resin, melting point 126° C.

Fixing agent 2: Copolymerized nylon "VESTAMELT" (registered trademark) 250-P1 manufactured by Daicel-Evonik Ltd., thermoplastic resin, melting point 123° C.

Fixing agent 3: Polyamide particles described in Example 3 of WO 2013/133421 were used.

(Thermoplastic Matrix Resin)

Polyamide 6: which may be abbreviated as PA 6 in some cases below.

Crystalline resin, melting point 225° C., decomposition temperature (in air) 300° C.

2. Production Method (Coating Method)

(1) Dry Coating

In dry fixing agent coating, the fixing agent was continuously coated from an upper portion to the carbon fiber bundle traveling in a horizontal direction by using an automatic gun (GX531N manufactured by Parker Engineering Co., Ltd.) included in an electrostatic powder coating apparatus (GX8500aS manufactured by Parker Engineering Co., Ltd.). A coating amount of the fixing agent was adjusted to be an adhesion amount described in each Example or Comparative Example.

(2) Wet Coating

In wet fixing agent coating, the carbon fiber bundle was continuously dipped and coated in a solution in which the fixing agent was dispersed in water. A coating amount of the fixing agent was adjusted to be an adhesion amount described in each Example or Comparative Example.

(Charging Method)

In charging of the fixing agent, a corona discharger included in an automatic gun for electrostatic powder coating (GX531N manufactured by Parker Engineering Co., Ltd.) was used, ions were generated from a corona discharge electrode by applying a high voltage to the electrode, and the fixing agent was passed therethrough, so that the fixing agent was charged. A voltage for charging was set to 50 kV.

(Heating and Melting of Fixing Agent)

After the fixing agent was applied to the carbon fiber bundle, they were heated by a 30 kW infrared heater (manufactured by NGK Kilntech Co., Ltd.), the fixing agent was heated and melted, and the fixed carbon fiber bundle was obtained by winding after cooled and solidified.

3. Evaluation Method

Dividing tear load

Samples were prepared by cutting the fixed carbon fiber bundle or the carbon fiber bundle described in each Example and Comparative Example so as to have a carbon fiber length of 100 mm. A slit having 30 mm length in a fiber axis direction is formed from one end of the cut sample at a center in a sample width direction to form a first end a and a second end b. As shown in FIG. 1, the first end was fixed to a force gauge (a digital force gauge manufactured by Imada Co., Ltd., ZP-20N), and in a state in which an angle between the first end a and the second end b is 180 degrees, the second end b was moved in a direction of an arrow 101 to start a measurement test of a "dividing tear load". The second end b was moved until the sample was completely torn, and a maximum load at that time was measured. An average value of measured values of ten samples was evaluated as the "dividing tear load".

Average distance between single fibers

The average distance between single fibers was calculated from the following formula (b) by using the number of the single fibers (Mi) contained in the carbon fiber before applying the fixing agent, a width (Wi μm) of the carbon fiber bundle, a thickness (Ti μm) of the carbon fiber bundle, and a fiber diameter (Di μm).

$$\text{Average distance between single fibers}(\mu m) = Wi/(Mi/(Ti/Di)) - Di \quad (b)$$

The width of the carbon fiber bundle was measured with a ruler (manufactured by Shinwa Rules Co., Ltd.), and the thickness was measured by a micrometer (manufactured by Mitutoyo Corporation).

Median diameter

Median diameters (D50) of various fixing agents were measured using a laser diffraction scattering particle size distribution analyzer (LA-960 manufactured by HORIBA, Ltd.)

Uneven distribution of fixing agent

The fixed carbon fiber bundle was cut, the cross section was observed with a digital microscope (VHX-6000 manufactured by Keyence Corporation), and a ratio of a cross-sectional area of the resin present on an outer side (one side and both sides) of the carbon fiber bundle to a total cross-sectional area of the resin was measured.

More than 70% and 100% or less: Excellent
70% or less: Bad

Adhesion area of fixing agent on one side of fixed carbon fiber bundle (%)

An adhesion area of the fixing agent on one side can be measured by observing a cross section of the fixed carbon fiber bundle. Specifically, the fixed carbon fiber bundle is cut in the width direction, and the cut surface is observed with a microscope. Regarding a surface to which the fixing agent adheres, the adhesion area of the fixing agent on one side can be expressed by the following formula using a length (Lr) of a cross section of the fixing agent present on an outermost surface and a length (Lf) of a cross section of the carbon fiber present on an outermost surface. A void is ignored.

$$\text{Adhesion area (\%) of fixing agent on one side} (\%) = 100 \times Lr/(Lr+Lf)$$

A value of the adhesion am is evaluated by the average value of the measured values when 10 points are observed.

Results in Examples 1 to 6 and 9 are shown below.
Example 1: 51%
Example 2: 77%
Example 3: 80%
Example 4: 100%
Example 5: 100%
Example 6: 52%
Example 9: 51%

Adhesion efficiency

An adhesion efficiency of the fixing agent was calculated by the following formula using a weight Wa (kg) of the fixing agent coated (supplied) from a coating apparatus and a weight Wb (kg) of the fixing agent actually adhering to the carbon fiber bundle.

$$\text{Adhesion efficiency (\%)} = Wb/Wa \times 100$$

Average thickness of fixed carbon fiber bundle

A thickness of the sample was measured at 20 points at intervals of 5 m by using a micrometer manufactured by Mitutoyo Corporation, and an average value of the measured values is defined as an average thickness of the fixed carbon fiber bundle.

Stability evaluation of fixed carbon fiber bundle during dividing

The fixed carbon fiber bundle having a length of 10 m was prepared, an initial 300 mm of the divided fixed carbon fiber bundle (an area of 300 mm in the length direction from an end that contacted with the blade first) obtained by dividing with a scoring dividing apparatus using 11 blades whose interval is set to 2 mm was observed, and a fiber width was evaluated. Specifically, the evaluation is as follows.

Widest fiber width of divided fixed carbon fiber bundle is less than 3 mm: Good

Widest fiber width of divided fixed carbon fiber bundle is 3 mm or more: Bad

Number of single yarns after dividing

The number of single yarns contained in the obtained divided fixed carbon fiber bundle was measured. Here, the "single yarn" refers to a divided fixed carbon fiber bundle having a width of 0.2 mm or less.

Results in Examples 1, 2, 7, and 8 are shown below.
Example 1: 25
Example 2: 5
Example 7: 4
Example 8: 1

In Examples 1 and 2 in which a coating method of the fixing agent is a dry method, more single yarns are generated compared to Examples 7 and 8 which is a wet method and are preferable from a viewpoint that generation of the bundles or single yarns is easier.

Example 1

A carbon fiber "Tenax" (registered trademark) STS40-24K (average fiber diameter: 7 μm, number of single fibers: 24,000) manufactured by Teijin Limited was used as the carbon fiber, and the carbon fiber bundle having a width of about 10 mm was opened to a width of 20 mm so that the thickness of the carbon fiber bundle was 100 μm. The average distance between single fibers of the opened carbon fiber bundle was 2.8 μm. Powdery copolymerized nylon "VESTAMELT" (registered trademark) Hylink manufactured by Daicel-Evonik Ltd. was coated and melted and solidified as the fixing agent to fix the opened state of the carbon fiber bundle. A median diameter of the powdery fixing agent was 47.1 μm. A weight fraction of the fixing agent contained in the fixed carbon fiber bundle was 2.0%. A dividing tear load of the fixed carbon fiber bundle was measured to be 0.07N. An average thickness of the prepared fixed carbon fiber bundle was 140 μm. The adhesion area of the fixing agent was 100% on one side of the carbon fiber bundle (a surface on which the fixing agent was coated). Subsequently, the fixed carbon fiber bundle was divided into 20 (20 bundles) with a micro slitter so as to have a width of 1 mm in the width direction. The results are shown in Table 1.

Examples 2 and 3

Fixed carbon fiber bundles are produced in the same method as in Example 1 except that weight fractions of the fixing agent were 4.5% and 14.2% of the total fixed carbon fiber bundle, respectively. The results are shown in Table 1.

Examples 4 and 5

A fixed carbon fiber bundle is produced in the same method as in Example 1 except that weight fractions of the fixing agent were 20.0% and 30.0% of the total fixed carbon fiber bundle, respectively. The results are shown in Table 1.

Example 6

A fixed carbon fiber bundle is produced in the same manner as in Example 1 except that the fixing agent is copolymerized nylon "VESTAMELT" (registered trademark) 250-P1 manufactured by Daicel-Evonik Ltd. The results are shown in Table 1.

Example 7

A fixed carbon fiber bundle is produced in the same method as in Example 1 except that wet coating was performed using the fixing agent 3. The results are shown in Table 1.

Example 8

A fixed carbon fiber bundle is produced in the same method as in Example 7 except that a weight fraction of the fixing agent was 4.5%. The results are shown in Table 1.

Example 9

A fixed carbon fiber bundle is produced in the same manner as in Example 1 except that the fixing agent was applied without being charged. In order that the same amount adheres, twice of the fixing agent of Example 1 was supplied. The results are shown in Table 1.

Example 10

The fixing agent is supplied in the same manner as in Example 9 except that the fixing agent was wet-coated. Concentration management is difficult, and even though the fixed carbon fiber bundle having a length of 100 m was experimented, stable production is difficult. The results are shown in Table 1.

Comparative Example 1

A carbon fiber "Tenax" (registered trademark) STS40-24K (average fiber diameter: 7 μm, number of single fibers: 24,000) manufactured by Teijin Limited was used as the carbon fiber, and the carbon fiber bundle having a width of about 10 mm was opened to a width of 20 mm so that the thickness of the carbon fiber bundle was 100 μm. Subsequently, the carbon fiber bundle was divided into 20 (20 bundles) with a micro slitter so as to have a width of 1 mm in the width direction. Since the carbon fiber bundle was not fixed, the divided carbon fiber bundle returns to a state of the carbon fiber bundle before dividing, thus stability of the dividing was bad. The results are shown in Table 1.

TABLE 1

| | Example 1 | Example 2 | Example 3 | Example 4 | Example 5 | Example 6 | Comparative Example 1 | Example 7 | Example 8 | Example 9 | Example 10 |
|---|---|---|---|---|---|---|---|---|---|---|---|
| Carbon fiber bundle | | | | | | | | | | | |
| Thickness after opening (μm) (Thickness just before applying fixing agent) | 101 | 100 | 108 | 105 | 101 | 113 | 98 | 101 | 103 | 110 | 100 |
| Fixing agent | | | | | | | | | | | |
| Type | Fixing agent 1 | Fixing agent 1 | Fixing agent 1 | Fixing agent 1 | Fixing agent 1 | Fixing agent 2 | None | Fixing agent 3 | Fixing agent 3 | Fixing agent 1 | Fixing agent 1 |
| Median diameter (μm) | 47.1 | 47.1 | 47.1 | 47.1 | 47.1 | 50.7 | | 0.57 | 0.57 | 47.1 | 47.1 |
| Charge | Yes | Yes | Yes | Yes | Yes | Yes | — | No | No | No | No |
| Coating method | Dry | Dry | Dry | Dry | Dry | Dry | — | Wet | Wet | Dry | Wet |
| Adhesion efficiency | 68% | 65% | 65% | 63% | 60% | 64% | — | — | — | 41% | — |
| Adhesion amount (weight %) with respect to entire fixed carbon fiber bundle | 2.0 | 4.5 | 14.2 | 20.0 | 30.0 | 2.0 | — | 2.0 | 4.5 | 2.0 | 2.0 |
| Fixed carbon fiber bundle | | | | | | | | | | | |
| Dividing tear load (N) | 0.07 | 0.10 | 0.25 | 0.28 | 0.32 | 0.06 | 0.01 | 0.06 | 0.1 | 0.07 | 0.07 |
| Average thickness (μm) | 126 | 133 | 148 | 165 | 179 | 130 | 98 | 105 | 112 | 126 | 133 |
| Average distance between single fibers (μm) | 2.8 | 2.7 | 2.8 | 2.2 | 2.5 | 2.7 | 2.8 | 2.8 | 2.7 | 2.7 | 2.7 |

TABLE 1-continued

| | Example 1 | Example 2 | Example 3 | Example 4 | Example 5 | Example 6 | Comparative Example 1 | Example 7 | Example 8 | Example 9 | Example 10 |
|---|---|---|---|---|---|---|---|---|---|---|---|
| Dividing tear load ÷ Thickness of fixed carbon fiber bundle (N/mm) | 0.56 | 0.75 | 1.69 | 1.70 | 1.79 | 0.46 | 0.10 | 0.57 | 0.89 | 0.56 | 0.53 |
| Uneven distribution of fixing agent | Excellent | Excellent | Excellent | Excellent | Excellent | Excellent | — | Bad | Bad | Excellent | Excellent |
| Stability of dividing | Good | Good | Good | Good | Good | Good | Bad | Good | Good | Good | Good |

INDUSTRIAL APPLICABILITY

The fixed carbon fiber bundle of the present invention can be stably divided and is suitable for producing a composite material having stable performance. The composite material can be used for various components such as components of an automobile; and at all sites where impact absorption is desired, such as frames or housings of various electrical products or machines. Preferably, it can be used as an automobile part.

Although the invention has been described in detail with reference to the specific embodiments, it will be apparent to those skilled in the art that various changes and modifications can be made without departing from the spirit and scope of the invention.

The present application is based on Japanese Patent Application No. 2017-180992 filed on Sep. 21, 2017, contents of which are incorporated herein as reference.

REFERENCE SIGN LIST a: First end
b: Second end
101: Tear direction
201: Opening step
202: Applying step
203: Heating step
204: Dividing step
301: Upper blade
302: Lower blade
303: Fixed carbon fiber bundle
304: Fixed carbon fiber bundle escaped from blade

What is claimed is:

1. A method for producing a fixed carbon fiber bundle, comprising:
   causing a fixing agent to adhere to a carbon fiber bundle after opening of the carbon fiber bundle to which a sizing agent adheres;
   fixing a width and a thickness of the carbon fiber bundle after setting an average thickness to 180 μm or less;
   dividing the fixed carbon fiber bundle into two or more divided fixed carbon fiber bundles;
   cutting the divided fixed carbon fiber bundles into discontinuous divided fixed carbon fiber bundles;
   wherein a weight fraction of the fixing agent contained in the fixed carbon fiber bundle is 0.5% or more and 30% or less with respect to the entire fixed carbon fiber bundle; and
   wherein the fixing agent adheres to at least one side of the carbon fiber bundle, and a dividing tear load of the fixed carbon fiber bundle is 0.02N or more and 1.00N or less.

2. The method for producing a fixed carbon fiber bundle according to claim 1,
   wherein the fixing agent adheres to an area of at least 50% or more of one side of the carbon fiber bundle.

3. The method for producing a fixed carbon fiber bundle according to claim 1,
   wherein the fixing agent is a thermoplastic resin having a softening point of 60° C. or higher and 250° C. or lower, and the fixing agent fixes the carbon fiber bundle by melt solidification.

4. The method for producing a fixed carbon fiber bundle according to claim 1,
   wherein a method for causing the fixing agent to adhere to the carbon fiber bundle is a dry process.

5. The method for producing a fixed carbon fiber bundle according to claim 1,
   wherein the fixing agent is a powder having a median diameter of 5 μm or more and 300 μm or less.

6. The method for producing a fixed carbon fiber bundle according to claim 5,
   wherein an average distance between single fibers of the carbon fiber bundle is smaller than the median diameter of the fixing agent.

7. The method for producing a fixed carbon fiber bundle according to claim 1,
   wherein the method of causing the fixing agent to adhere to the carbon fiber bundle is a method of charging the fixing agent to adhere to the carbon fiber bundle.

8. The method for producing a fixed carbon fiber bundle according to claim 1,
   wherein the fixing agent is localized on one side or both sides of the carbon fiber bundle.

9. A method for producing a composite material, comprising:
   providing a fixing agent to adhere to a carbon fiber bundle after opening of the carbon fiber bundle;
   fixing a width and a thickness of the carbon fiber bundle after setting an average thickness to 180 μm or less;
   dividing the fixed carbon fiber bundle into two or more divided fixed carbon fiber bundles;
   cutting the divided fixed carbon fiber bundles into discontinuous divided fixed carbon fiber bundles; and
   impregnating the discontinuous divided fixed carbon fiber bundle with a thermoplastic matrix resin;
   wherein a weight fraction of the fixing agent contained in the fixed carbon fiber bundle is 0.5% or more and 30% or less with respect to the entire fixed carbon fiber bundle; and
   wherein the fixing agent adheres to at least one side of the carbon fiber bundle, and a dividing tear load of the fixed carbon fiber bundle is 0.02N or more and 1.00N or less.

10. The method for producing a composite material according to claim 9,
  wherein the fixing agent adheres to an area of at least 50% or more of one side of the carbon fiber bundle.

11. The method for producing a composite material according to claim 9,
  wherein the fixing agent is a thermoplastic resin having a softening point of 60° C. or higher and 250° C. or lower, and the fixing agent fixes the carbon fiber bundle by melt solidification.

12. The method for producing a composite material according to claim 9,
  wherein the fixing agent is a powder having a median diameter of 5 µm or more and 300 µm or less.

13. The method for producing a composite material according to claim 12,
  wherein an average distance between single fibers of the carbon fiber bundle is smaller than the median diameter of the fixing agent.

14. The method for producing a composite material according to claim 9,
  wherein the method of causing the fixing agent to adhere to the carbon fiber bundle is a method of charging the fixing agent to adhere to the carbon fiber bundle.

15. The method for producing a composite material according to claim 9,
  wherein the fixing agent is localized on one side or both sides of the carbon fiber bundle.

* * * * *